Patented Oct. 5, 1954

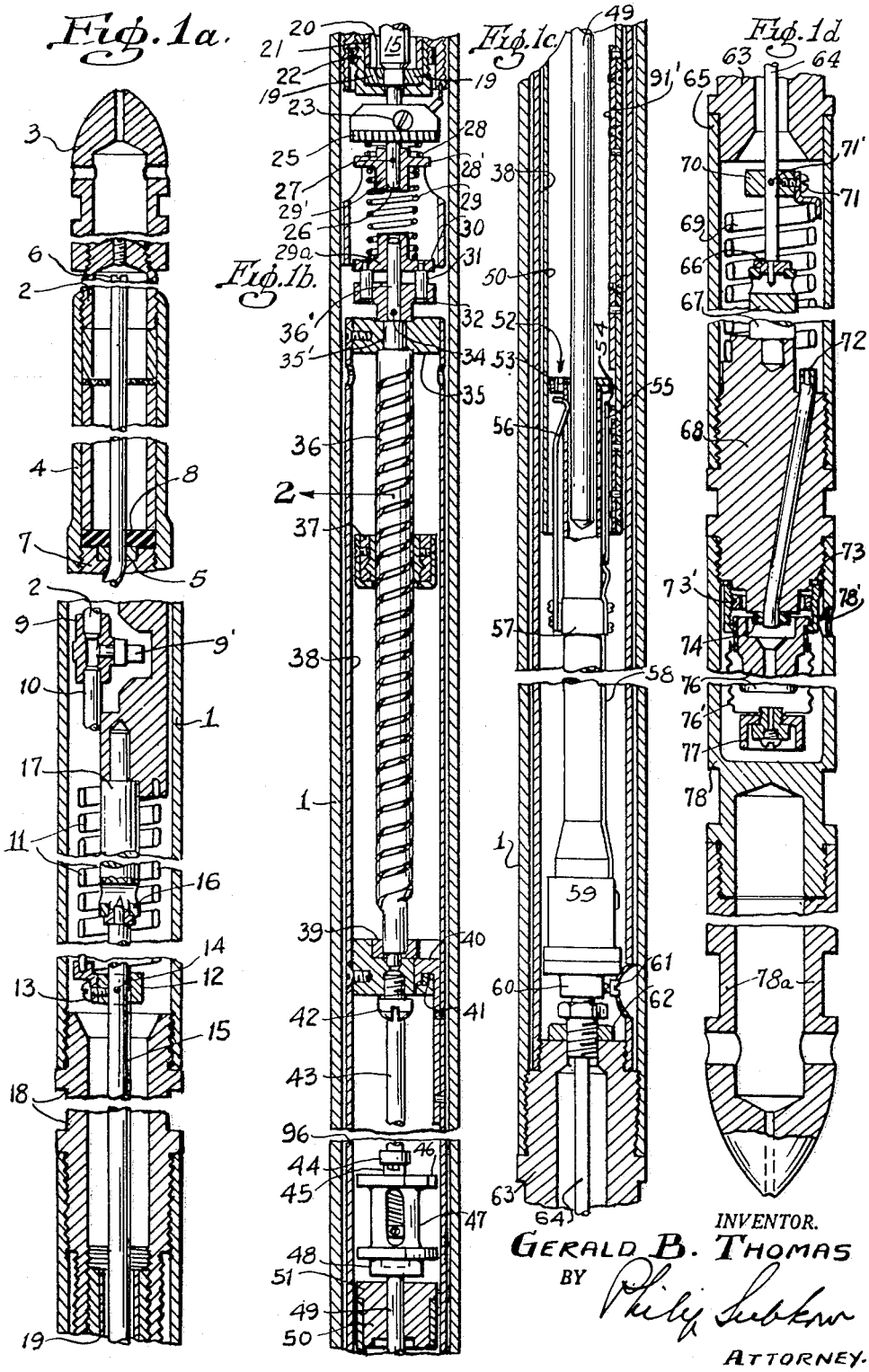

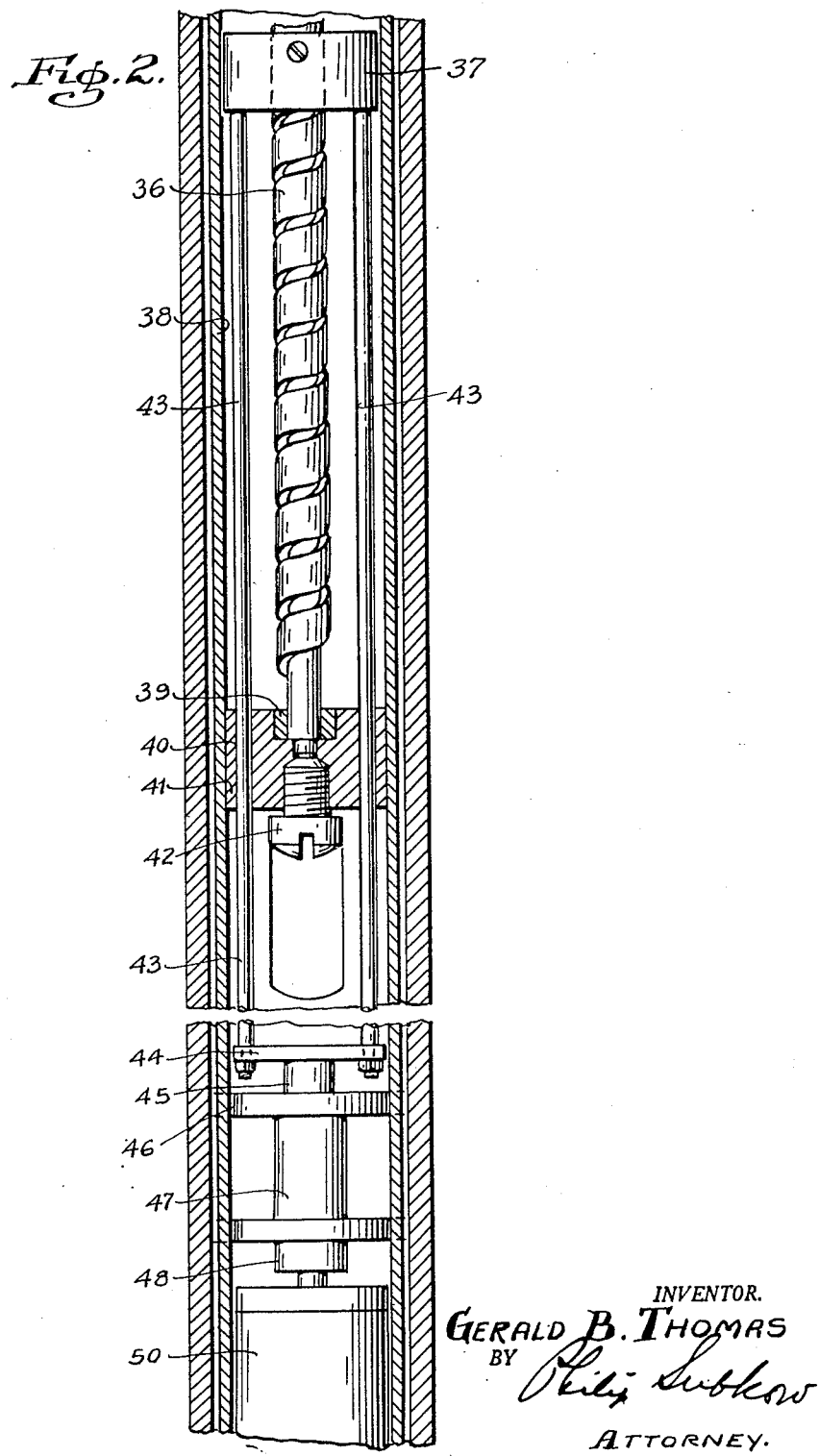

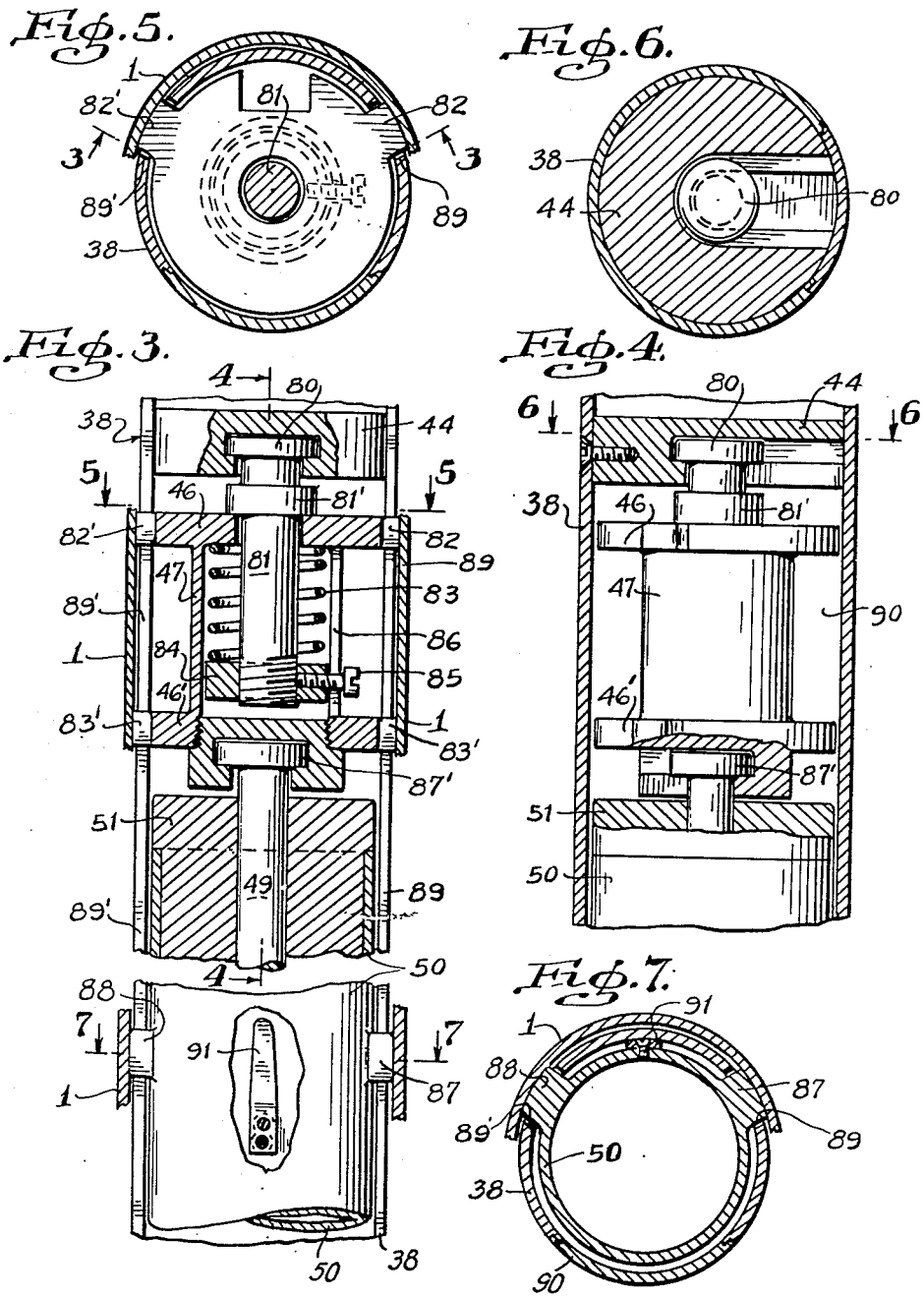

2,690,674

UNITED STATES PATENT OFFICE 2,690,674

INERTIAL MARKING DEVICE FOR SUBSURFACE GAUGES

Gerald B. Thomas, Los Angeles, Calif., assignor to Signal Oil and Gas Company, Los Angeles, Calif., a corporation of Delaware Application November 14, 1949, Serial No. 127,181

13 Claims. (Cl. 73—345)

This application is a continuation-in-part of Serial No. 72,450, filed January 24, 1949, and of application Serial No. 87,613, filed April 15, 1949.

This invention relates to devices for performing surveys in bore holes drilled into the earth, and more particularly in bore holes extended for the production of petroleum or gas from the earth.

As is generally known, it is common practice to determine the physical characteristics of the bore hole and of the earth's environment by lowering an instrument into the bore. Such instrument may measure pressure or temperature. These instruments may be of the single shot variety which are lowered to a known depth in the bore hole and recovered from such depth, a single record being made at one depth. They may be of the traverse type, i. e., whereby they are lowered into the bore hole, and the characteristics recorded at varying depths, but in all such cases the record obtained must be correlated with depth.

The object of my invention is to devise an instrument which will be self-contained and which will produce a recognizable mark on the record of the physical characteristics made by the instrument and which mark may be correlated with depth.

In the prior art, in the traverse type of instrument, in which any record of the measured physical characteristic and its variation with depth is made, is recognized by recording this variation as a function of time of traverse of the instrument. By recording simultaneously time and the measured characteristic, a trace is obtainable which is a function of both time and the characteristic. The time function is obtained usually by means of a clock which is set in motion as the instrument is let into the well. Time is also recorded at the surface as is also the depth by means of measuring the length of line passed out in lowering the instrument, said length being correlated with the time interval of the lowering process. Thus, knowing the depth obtained at any time interval of the lowering, the same interval may be read from the trace and the magnitude of the characteristic recorded and such time interval on the instrument is readable from the record.

In this procedure there is always an interval of time between the starting of the clock and the start of the lowering process. This is occasioned by the fact that the instrument must be in partly disassembled condition when the clock is started. Then the instrument is assembled and introduced into the well, adjustments made, and the lowering started. Time is kept at the surface of the duration of this procedure and a correction must be made by measuring back on the record the recorded time, and, by interpolation on the record, determining the value of the recorded characteristics at the corrected time corresponding to the depth recorded at the surface for such time.

Additionally, temperature in bore holes increases with depth, and the driving mechanism connecting the clock and recording mechanism is affected by such temperature and introduces an important error in the recordation of the time function in the instrument. In other words, the clock record in the instrument is out of step with the clock record at the surface so that it cannot be said with certainty that the interval of time recorded by the clock in the instrument is the same as that recorded by the clock at the surface.

In order to avoid such uncertainties, it is often the practice to stop the descent of the instrument for a recorded period of time at successive depths the value of which is known from surface measurements. Where the characteristics recorded change progressively with depth, the stopping of the instrument at a known depth for a short time will produce a plateau in which such characteristics do not change with time. This will permit of a check on the depth measurement and of a correlation and correction of clock timing with depth. This procedure has the disadvantage that it introduces an undesirable delay in the traverse.

In another method the instrument is lowered to a series of depths, measured by recording the amount of lowered line, and allowed to come to rest at each depth so that equilibrium is established. No effort is made to take the measurements between such depths. In other words, the clock merely acts to cause an advance of the chart so that a trace can be made. The chart between the stopping point is ignored, and since the number of stops made and the corresponding depth at each succeeding stop is known, the actual depth at each plateau is known and the magnitude of the recorded characteristic at each plateau may be measured from the chart.

It will be recognized that in order to make a determinable plateau, a significant time interval must be allowed at each stop. This makes it impracticable, especially in deep bores, to make the interval between stops small so that frequently significant variations of the characteristics between stops are missed.

The correlation method has the difficulty arising from the indeterminacy of the effect of temperature on the clock mechanism or, in the case of pressure measurement, on the pressure recordation, and in the case of the step method the value of the characteristics between the stops is not obtained.

The pressure gages of the prior art are affected by temperature so that it is necessary to calibrate the pressure gage for temperature variation. Thus pressures as measured by sub-surface gages are not accurately determined unless they are corrected for sub-surface temperature at the point of measurement. Such temperature depends not only on the geothermal gradient, but also upon such accidental factors as entry of fluid into the bore hole, the velocity and quantity of fluid, nature of fluid, and the mechanical condition of the bore hole at the point of measurement. It is thus always necessary to estimate the temperature at the point of measurement. The usual procedure is to determine this from the known regional geothermal gradient. This, while more satisfactory in the case of a shut-in well, where thermal equilibrium is established, may, in a flowing well, give largely erroneous results. It is thus necessary to make a separate thermometric survey to obtain accurate temperatures at the same depths as that at which the pressure is to be determined. This introduces another time-consuming operation.

I have devised a mechanism which obviates these difficulties and permits a recordation of a mark which is correlatable with depth, temperature, and pressure without any substantial interruption of the progress of the traverse. I have devised an instrument for measuring pressure and temperature simultaneously which avoids the above difficulties.

Instead of employing the clock mechanism, I employ in the invention of this application a temperature responsive device and a pressure responsive device which are mounted in such manner that a simultaneous record of temperature, pressure, and depth is made. The instrument may be lowered or raised in the bore hole at the desired rate to obtain a continuous record under equilibrium conditions so that the trace of the recorded characteristics is a true record thereof throughout the traverse of the instrument. I superimpose on such record a mark which is correlatable with temperature, pressure, and depth, and does not require any recordation of the time interval involved.

In the preferred embodiment of my invention I introduce a motor means actuable from the surface in the preferred form of an inertially operated device which actuates a recording mechanism. In my preferred embodiment, I employ a resiliently suspended mass, which mass may be the instrument or a portion thereof or a separately suspended mass. By suddenly stopping, accelerating or decelerating the descent of the instrument, the variation in speed actuates the inertial device so as to make a mark. Since I may so stop, accelerate, or decelerate the device as frequently as I wish and since the interval of descent during such stoppage, acceleration or deceleration may be made as short as desired or even reduced to zero, i. e., by stopping the instrument, I may make as many such marks as I wish and thus obtain an accurate record of the variations of the characteristics with depth and, of course, record the depth, i. e., length of passed-out line at each point of such acceleration or deceleration.

In order to obtain these advantages I mount a thermometric device in the instrument to actuate a record making device so that the record making device is actuated in proportion to the ambient temperature in the bore hole at the place of measurement, and I also mount a pressure responsive element in the bore hole and connect the same to actuate a record making device in proportion to the pressure in the bore hole at the location at which the measurement is to be made. Means are provided in the instrument to be actuated from the surface so that a mark is made on the record which is correlatable with depth. The result of the functioning of the thermometric pressure and inertial device is that I may at any desired location in the bore hole produce a record which is correlatable simultaneously with the pressure, temperature, and at the location and correlatable with the depth at said location.

In a preferred embodiment I mount a chart holder which is actuated by a thermometric motor and connect a marking system to a pressure bomb. The relationship of parts is such that at any location of the instrument the relationship of the stylus, employed to mark the chart, to the chart is determined both by the temperature and by the pressure. It will be observed then that such an instrument, when it is lowered into the bore hole in which both temperature and/or pressure exist will result in the stylus making a line trace the co-ordinates of which are pressure and temperature. In a preferred embodiment I mount the chart holder so that it is resiliently suspended and may be inertially actuated by an alteration of the acceleration of the instrument via the lowering line, so that when so actuated the chart holder bounces to cause the stylus to form a discernible mark on the chart which is thus correlated with depth as well as the temperature and pressure at the depth recorded.

The instrument is so constructed that it is possible, while lowering it in the bore hole, to maintain the instrument in equilibrium with its environment so that the record will be a true measure of the magnitude of gradient of pressure and of temperature throughout the bore hole.

Because, as is well known to those skilled in the art, the temperature may not be a continuous function of depth, due to local variations in thermal gradient, it is particularly desirable to have a continuous trace of the actual variation of temperature. My device permits of such continuous trace of the temperature and the other recorded variable (e. g. pressure) function and the recording of the depth mark at close intervals of the depth measurements.

These and other objects of my invention will be understood from the further description of the preferred embodiment of my invention taken together with the drawings, in which:

Figs. 1a, 1b, 1c and 1d are consecutive vertical part sections of my device as applied to a subsurface pressure gage;

Fig. 2 is a part section taken on line 2—2 of Fig. 1;

Fig. 3 is a section taken on line 3—3 of Fig. 5;

Fig. 4 is a side view of Fig. 3;

Fig. 5 is a section taken on line 5—5 of Fig. 3;

Fig. 6 is a section on line 6—6 of Fig. 4; and

Fig. 7 is a section on line 7—7 of Fig. 3.

On one end of the instrument housing is mounted the thermometer bulb 2 by means of sleeve 4 and bushing 5 and gaskets 8. The thermometer bulb contains a fluid which will generate a pressure which is responsive to temperature. The pressure tube 6 projecting into thermometric bulb 2 passes through the bushing 5 and the packer 8 positioned in the base 7, and is connected to the tube 10 through the intermediary of a coil connector 9 to which a closable filling plug 9' is attached. Tube 10 is connected to the helical coil 11 which is in the form of a flat, flexible helical Bourdon tube. The other end of the Bourdon tube is connected to the collar 12 mounted on shaft 15 by means of a screw 13 and a shaft connector pin 14. The shaft 15 passes through a bore in the housing coupling 18 and is pivotally mounted upon a shaft support 17 and upon a shaft bearing 16. The shaft 15 is mounted at the other end upon a jewel retainer 21 bearing a jewel 19, a jewel lock nut 22. The shaft 15 is connected by a clamp 25 and screw 23 to the shaft 26 which is pinned by pin 27 to the coupling 29'. The coupling carries a flange 28'. Between the flange 28' and clamp 25 is mounted a spring 28. This flexible coupling is connected to shaft extension 36' by means of a clutch composed of an upper clutch plate 30, clutch pins 31 and lower clutch plate 32 which is pinned at 34 to the shaft extension 36'. The clutch plate 30 is connected to the connector by means of the clutch spring 29.

The shaft extension 36' is connected to the helical worm 36 which is rotatably mounted in the bearing 35' in plug 35 mounted upon the inner housing 38. End bearing 39 in plate 40 is adjustable by means of screw 42. The nut 37 mounted in the inner housing 38 is free to move up and down when screw 36 rotates in the bearings. Rods 43 connected to nut 37 pass through bores in the plate 40 and are connected to the chartholder lift 44. A cover 90, held by cover latch 41, provides access to the interior of 38. The chartholder lift has an inertial unit in the form of a cylinder 47 closed at both ends by plates 46 and by a plug in plate 46'. The rod 81 passes through a bore in the plate 46 and carries a block 84 which is held, by a screw 85, slidably positioned in slot 86 in the cylinder 47. The upper end of the rod 81 carries a shoulder 81' and a cylindrical T block 80. The cylindrical T block 80 is positioned in a T slot in the chartholder lift 44. A spring 83 is positioned inside the cylinder 47 underneath and between the plate 46 and the upper face of the block 84. The plate 46 has two ears 82 and 82', and the plate 46' has two ears 83' which enter into slots 89 and 89' in the inner housing 38.

The chartholder 50 is closed by a plug 51. The rod 49 passes through the block 51 by means of a sweat or driven fit, and has a shouldered head 87' which engages the inertial unit 47 through a suitable T slot provided therefor. The block 51 forms the top cover of the chartholder 50. The chartholder 50 has ears 87 and 88 which pass through the slot 89 and 89', respectively, between the inner housing 38 and cover 90 and carries at its lower end a spring 91 which presses against the interior of the cover 90 to hold it in place. The interior of the cylindrical chartholder has a chart retaining means 91' adapted to hold a piece of paper or the recording means.

The stylus 54 and its flexible mounting 55 are positioned on the tubular stylus mount 57 into which the rod 49 projects. A centralizing spring 56 mounted on stylus arm 57 centralizes the shaft 49 inside the tubular support 57.

The stylus support 57 is connected to the shaft 64 by means of collar 60 and the screw 61. The shaft 64 is rotatably mounted in bearing 62 positioned at the end of the housing coupling 63. The shaft 64 passes through a bore in the housing coupling 63. At the lower end of the shaft 64 is mounted foot bearing 66 positioned on the stylus shaft support 67 connected to the element base 68.

The flat tubular helical Bourdon tube coil 69 is clamped at the top end thereof by means of a shaft connector collar 70, screw 71, and pin 71'. The other end of the Bourdon tube 69 is connected to the pressure tube 72 passing through element base 68 which in turn is connected to the pressure responsive diaphragm or bellows 76' which is mounted upon element base 68 by means of gaskets 73 and the bellows adapter 73'. The interior of the bellows forms a fluid pressure chamber having a bellows spacer at 76. The lower end of the bellows 76' is closed by a filler plug 77. The bellows is filled with the fluid which is employed to transmit pressure. Surrounding the bellows and connected to the element base 68 is an oil trap 78 having at its upper end a vent 78'. Connected to the lower end of the oil trap may be a container 78a to which a maximum temperature recording thermometer may be positioned if it is desired for the purpose described below.

When this instrument is lowered into the bore hole on a line connected to 3, it will record both temperature and pressure upon the chart positioned on the chartholder 50. The thermometer bulb 2 will have a pressure generated therein responsive to the temperature which pressure is transmitted through tubes 6 and 10 and this will cause the Bourdon tube 11 to rotate the shaft 15 through the intermediary of the clamp 12. The rotation of the shaft 15 will cause a rotation of the shaft 26 through the intermediary of pin 27, thus causing a rotation of the coupler 29a and through the intermediary of the clutch assembly a rotation of the lead screw 36. This will cause the nut 37 to travel up or down the screw, depending upon the direction of rotation, thus causing the push rods 43 to move up or down. The inertial assembly to move up or down causing the chartholder to move up and down, the shaft 49 moving inside the stylus support 57. At the same time pressure exerted from the bore hole through the port 78' exerts a pressure on the exterior of the bellows 76' causing it to contract or expand, depending upon the direction of pressure, transmitting the pressure so generated through the tube 72 and causing the coil 69 to expand and contract and rotating the shaft 64 through the intermediary of the collar 70. The rotation of the shaft 64 causes a rotation of the stylus arm support 57 through the intermediary of the collar 60 and screw 61, the rotation of the stylus support 57 causing the rotation of the stylus which is mounted thereon by the connector 58. Thus variations in temperature will cause a chartholder to move up and down, vertically, axially of the instrument and the variation in pressure will cause the stylus to travel circumferentially of the chartholder 50.

It will be observed that the chartholder 50 is resiliently mounted on the push rods 43 by means of the inertial suspension 47. If, therefore, the descent of the instrument is checked or bounced the inertia of the descent due to the weight of the instrument below the plate 46 of the inertial unit will cause the spring to be depressed and when deceleration is stopped the spring 83 will rebound. Thus an oscillation of the chartholder will occur over the stylus. This may be done by either suddenly stopping the descent or suddenly bouncing the unit by putting pull upward on the lowering line.

This instrument may thus be lowered at a rate sufficient to permit thermal and pressure equilibrium to be established to give a trace which is truly representative of the pressure and temperature conditions present in the bore hole at all points throughout its depth. I can also impose on such trace joggles which can be made at any desired depths as the bore hole. In this manner the pressure and temperature can be accurately determined and by simple graphical interpolation the pressure and temperature at all depths between the joggle points also determined.

While I have described a particular embodiment of my invention for the purpose of illustration, it should be understood that various modifications and adaptations thereof may be made within the spirit of the invention as set forth in the appended claims.

I claim:

1. A sub-surface bore hole pressure and temperature gage, comprising a case adapted to be lowered into a bore hole, a flexible diaphragm in said case, a fluid pressure chamber in said case closed by said diaphragm, a port connecting one side of said diaphragm with the exterior of said case, a flexible fluid pressure transmitting tube connected to said chamber, a stylus, a connection between said stylus and said tube, a chart holder in operative association with said stylus, a thermometric element positioned in said case, means for resiliently suspending said chart holder in said case, a connection between said chart holder and said thermometer element for moving said chart holder in response to said thermometric element independently of the said pressure transmitting tube.

2. A sub-surface bore hole pressure and temperature gage, comprising a case adapted to be lowered into a bore hole, a flexible diaphragm in said case, a fluid pressure chamber in said case closed by said diaphragm, a port connecting one side of said diaphragm with the exterior of said case, a flexible fluid pressure transmitting tube connected to said chamber, a stylus, a connection between said stylus and said tube, a chart holder in operative association with said stylus, a thermometric bulb mounted in said case, a flexible fluid pressure transmitting tube connected to said bulb, a connection between said last-named tube and said chart holder for moving said chart holder independently of said pressure transmitting tube, and means for resiliently suspending said chart holder in said case.

3. A sub-surface bore hole pressure and temperature gage, comprising a case adapted to be lowered into a bore hole, a flexible diaphragm in said case, a fluid pressure chamber in said case closed by said diaphragm, a port connecting one side of said diaphragm with the exterior of said case, a flexible fluid pressure transmitting tube connected to said chamber, a stylus, a tubular chart holder in operative association with said stylus, a connection between said pressure transmitting tube and said stylus for moving said stylus circumferentially of said tubular chart holder, a thermometric bulb mounted in said case, a second flexible fluid pressure transmitting tube connected to said bulb, a connection between said last named tube and said chart holder for longitudinally advancing said chart holder with respect to said stylus, and means for resiliently suspending said chart holder with respect to said second flexible tube and said stylus.

4. A sub-surface bore hole pressure and temperature gage, comprising a case adapted to be lowered into a bore hole, a flexible diaphragm in said case, a fluid pressure chamber in said case closed by said diaphragm, a port connecting one side of said diaphragm with the exterior of said case, a flexible fluid pressure transmitting tube connected to said chamber, a stylus, a tubular chart holder in operative association with said stylus, a connection between said pressure tube and said stylus for moving said stylus circumferentially over said tubular chart holder, a thermometric bulb mounted in said case, a second flexible fluid pressure tube, a connection between said second flexible tube and said tubular chart holder for longitudinally advancing said chart holder with respect to said stylus, and a resilient suspension for mounting said chart holder with respect to said second flexible tube.

5. A sub-surface bore hole pressure and temperature gage, comprising a case adapted to be lowered into a bore hole, a flexible diaphragm in said case, a fluid pressure chamber in said case closed by said diaphragm, a port connecting one side of said diaphragm and the exterior of said case, a flexible fluid pressure transmitting tube connected to said chamber, a stylus, a rotatable stylus arm connected to said stylus and said tube for rotation of said stylus, a chart holder in operative association with said stylus, a screw, a travelling nut on said screw, means for resiliently suspending said chart holder on said screw, a thermometric bulb in said case, and a flexible pressure transmitting screw connected to said thermometric bulb and to said screw for rotation of said screw.

6. A sub-surface bore hole pressure and temperature recording gage, comprising a case adapted to be lowered into a bore hole, a pressure responsive flexible diaphragm positioned in said case, a temperature responsive means positioned in said case, a recording means positioned in said case, said recording means comprising a recording stylus element and a chart carrier element in marking relation to said stylus element, means positioned in said case, connected to said diaphragm and to said recording means, for actuating one of said elements of said recording means, means positioned in said case, connected to said temperature responsive means and to said recording means, for actuating the other of said elements of said recording means independently of the deflection of said diaphragm, and means positioned in said case for resiliently suspending one of said elements of said recording means in said case.

7. A sub-surface bore hole pressure and temperature recording gage, comprising a case adapted to be lowered into a bore hole, a pressure responsive flexible diaphragm positioned in said case, a temperature responsive means positioned in said case, a recording means, including a marking means, positioned in said case, means positioned in said case and connected to said diaphragm and to said recording means for actuating said recording means to make a mark correlatable with pressure, separate means positioned in said case and connected to said temperature responsive means and to said recording means for making a mark correlatable with temperature, an inertial motor means mounted in said case and actuatable upon variation in speed of travel of said case, and a separate and independent driving connection between said recording means and said inertial motor for making a mark on said recording means, said driving connection operating separate from and independent of said pressure and temperature responsive means upon actuation of said motor means.

8. A sub-surface bore hole pressure and temperature recording gage, comprising a case adapted to be lowered into a bore hole, a pressure responsive means, said means being positioned in said case, a chart carrier positioned in said case, a marking stylus in said case in marking relation to said chart carrier, motion transmitting means connected to said pressure responsive means and said stylus to actuate said stylus, a temperature responsive means positioned in said case, motion transmitting means connecting said temperature responsive means and said chart carrier to move said chart carrier with respect to said stylus, independently of the motion of said stylus, and means for resiliently suspending said chart carrier in said case.

9. A sub-surface bore hole pressure and temperature gage, comprising a case adapted to be lowered into a bore hole, a pressure responsive means positioned in said case, a temperature responsive means positioned in said case, a recording means in said case, comprising a chart holder element and a stylus element, a motion transmitting means connected to said pressure responsive means and one of said elements, a motion transmitting means connected to said temperature responsive means and the other of said elements, whereby a mark correlatable with temperature and pressure is recorded on said recording means, an inertial motor means mounted in said case and actuatable upon variation in speed of travel of said case, means to raise and lower said case from the surface, and a motion transmitting connecting means between said motor means and said recording means, whereby a mark is made on said recording means independently of said pressure and temperature responsive means upon actuation of said motor means.

10. A sub-surface bore hole pressure and temperature recording gage, comprising a case adapted to be lowered into a bore hole, a pressure responsive means positioned in said case, a temperature responsive means positioned in said case, a recording means in said case, comprising a stylus element and a chart holder element in marking relation to said stylus element, a resilient suspension for said chart holder, a motion transmitting connection between the pressure responsive element and one of said elements, and a motion transmitting connection between the temperature responsive means and the other of said elements, both of said motion transmitting means being positioned in said case.

11. A subsurface bore hole instrument, comprising a case, a thermometric motor in said case, a screw mounted for rotation by said motor, a travelling nut on said screw, a holder for carrying a chart, a resilient suspension between said chart holder and said nut, a stylus in operative relation to said chart holder, a pressure responsive element in said case connected to said stylus, and means for effecting an oscillation of the chart holder on said resilient suspension to impress a distinctive marking on the chart.

12. A subsurface bore hole instrument, comprising a case adapted to be lowered into a bore hole, a first condition responsive device in said case, a second condition responsive device in said case, each of said devices being responsive to a different condition in said bore hole, a recording means in said case adapted to make a continuous record, said recording means including a marking means and chart holder, and means for moving said marking means and chart holder relative to each other, said moving means including a motion transmitting connection between said recording means and said first device for moving the marking means, a motion transmitting connection between said recording means and said second device for moving the chart holder, and said recording means also including an inertial mass positioned in said case and movable relative to said case, means actuatable from the surface for moving said mass relative to said case, and means independent of said devices responsive to the motion of said mass for effecting movement of said marking means and chart holder relative to each other independently of the relative motion of the marking means and said chart holder in response to actuation by said devices.

13. A subsurface bore hole instrument comprising, a case adapted to be lowered into a bore hole, a pressure responsive device in said case, a temperature responsive device in said case, a recording means adapted to make a continuous record of temperature and pressure, said recording means including a marking element and a chart holder element, means for moving said elements relative to each other, said moving means including a motion transmitting connection between the recording means and the pressure responsive device for moving one of said elements, a motion transmitting connection between the recording means and the temperature responsive device for moving the other of said elements, and said moving means also including a mass positioned in said case, means actuatable from the surface for moving said mass, and said recording means including also means responsive to the motion of said mass for effecting movement of said elements relative to each other independently of the relative motion of said elements in response to actuation by said devices.

References Cited in the file of this patent

UNITED STATES PATENTS

| Number | Name | Date |
| --- | --- | --- |
| 1,837,222 | Kannenstine | Dec. 22, 1931 |
| 1,946,576 | Dunn et al. | Feb. 13, 1934 |
| 1,951,629 | Ross | Mar. 20, 1934 |
| 1,969,141 | McDonald | Aug. 7, 1934 |
| 2,015,851 | Herrick et al. | Oct. 1, 1935 |
| 2,268,682 | Webb | Jan. 6, 1942 |
| 2,396,724 | Spilhans | Mar. 19, 1946 |
| 2,593,285 | Fay et al. | Apr. 15, 1952 |